United States Patent [19]
Gordon et al.

[11] Patent Number: 4,922,518
[45] Date of Patent: May 1, 1990

[54] SELECTIVE DISSEMINATION OF INFORMATION

[76] Inventors: Alastair T. Gordon, 61 Dalewood Road, Toronto, Ontario, Canada, M4P 2N4; Michael H. Reichmann, 137 Blantyre Avenue, Toronto, Ontario, Canada, M1N 2R6

[21] Appl. No.: 187,908
[22] Filed: Apr. 29, 1988
[51] Int. Cl.⁵ .............................................. H04Q 7/00
[52] U.S. Cl. ...................................... 379/57; 379/93; 379/110; 340/825.44
[58] Field of Search .................. 379/57, 92, 93, 96, 379/97, 98, 106, 107, 110; 340/825.26, 825.44, 311.1

[56] References Cited
U.S. PATENT DOCUMENTS 4,104,486 8/1978 Martin et al. ..................... 379/106
4,677,434 6/1987 Fascenda ........................ 340/825.26
4,713,837 12/1987 Gordon ................................. 379/93
4,742,516 5/1988 Yamaguchi ..................... 340/825.44
4,811,379 3/1989 Grandfield ........................... 379/57

FOREIGN PATENT DOCUMENTS
0072567 6/1981 Japan .................................. 379/100

Primary Examiner—Robert Lev

[57] ABSTRACT

A delivery system for the selective dissemination of information to subscribers uses a non-telephone authorizing signal to authorize the subscriber stations for which information is to be delivered. The subscriber station, when authorized, dials up a predetermined number to form a telephone channel through which the information is delivered. The apparatus and method eliminate the need for a dedicated channel serving the station and preferably the subscriber station only seizes a telephone channel when available and therefore may share an existing telephone channel.

9 Claims, 1 Drawing Sheet

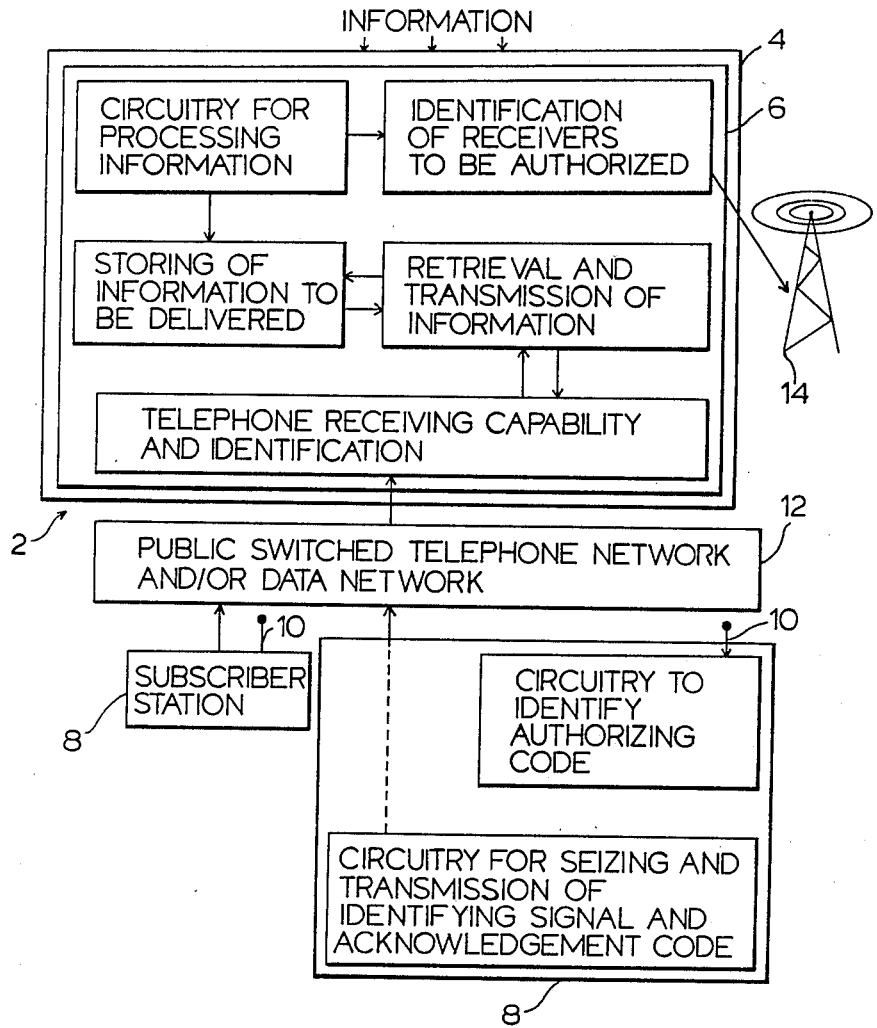

SELECTIVE DISSEMINATION OF INFORMATION

BACKGROUND OF THE INVENTION

The present invention relates to information services and apparatus and methods for delivering of the information electronically to subscriber stations.

U.S. Pat. No. 4,713,837 discloses a system for allowing effective transmission of information between two stations by means of a central processing facility using a non-telephone link for authorizing the particular station for which information is destined and using a telephone channel for transmitting of the information to the destined receiver. In copending application Ser. No. 07/137,799 filed Dec. 24, 1987, a system for improving the efficiency and/or reducing the cost in transmitting facsimile and like data transmissions is disclosed which again uses a non-telephone signal for authorizing a particular station and a telephone channel for communicating the information to the destined station when authorized.

According to the present application, a delivery system for the selective dissemination of information (S.D.I.) is proposed which uses a non-telephone signal for authorizing a particular station for which information is destined and a telephone channel for transmitting of the information to the station initiated by the station. At the present time in S.D.I. systems, direct delivery of information is only possible through the use of a communication channel dedicated to the subscriber's terminal. This is an expensive arrangement and a second type of service is offered where the user does not require a dedicated terminal. This second type of service is based on the user constantly checking his particular "mailbox" by phoning in to the source and is much less desirable than "direct delivery". It is apparent people have recognized that timely information is important and automatic and immediate delivery of the information ensures this is accomplished. Thus, the present system provides delivery of the information without requiring a dedicated phone line or other dedicated communication channel. Such a system provides the benefits of the dedicated system previously described at lower costs.

SUMMARY OF THE INVENTION

A method of selective dissemination of information according to the present invention comprises receiving information, processing the information according to requirements of the users, and producing a non-telephone link authorizing signal transmitted to users to which information is to be delivered. A receiver, upon receiving its non-telephone authorizing signal, automatically seizes a non-dedicated telephone channel when available, and dials a predetermined number to complete a telephone channel by means of which the processed information is delivered. The receiver produces a signal transmitted through the telephone channel identifying the receiver whereafter the processed information to be transmitted is determined by means of the identifying signal sent by the receiver and the appropriate processed information is transmitted to the receiver.

According to a preferred aspect of the invention, the non-telephone link authorizing signal is produced as a free air broadcast signal.

In a system for the selective dissemination of information to subscriber stations, in accordance with the present invention, an information delivery system comprises a central station having a capability for producing a non-telephone authorizing signal identifying individual subscriber stations by code when information is to be delivered to them, a capability for receiving incoming telephone communications and a capability for transmitting information to the subscriber stations over telephone channels once a particular station is identified. Each subscriber station includes a receiver for receiving the non-telephone authorizing signal and determining whether its particular authorizing code is present. The subscriber station when authorized automatically seizes a telephone channel when available for making a connection with the central station. Once connected with the central station, the subscriber station produces an identifying signal recognized by the central station and used thereby to identify information to be transmitted to the subscriber station.

BRIEF DESCRIPTION OF THE DRAWINGS

A schematic of the system of the present invention is shown in FIG. 1.

DETAILED DESCRIPTION OF THE PREFERRED EMBODIMENTS

The method for delivering selective information to subscribers can be appreciated from a review of FIG. 1. Information provided from news wires, stock quotes, information feeds, databases, etc., are provided to unit 6 for selective dissemination of information to individual subscriber stations shown as 8. In this case, the unit for selective dissemination of information 6 is shown as part of the central processing facility 4. This need not be the case and the process for the selective dissemination of information could be separate and apart, but connected to the central processing facility 4. As can appreciated, the particular subscribers 10 would identify the type of information they were interested in either by company, stock quote, volume, etc. When appropriate information is received or information is to be delivered to a subscriber 8, a code of the particular subscriber station is incorporated in a non-telephone communication signal. In the embodiment shown, the transmission tower 14 transmits the code as a free air broadcast to the subscriber stations 8. Each subscriber station has an antenna 10 to allow reception of the authorizing signal and thus allows the subscriber station to be authorized when information is to be delivered to it. Preferably, the broadcast signal originates from an FM paging network.

Each subscriber station 8 includes a dial-up circuit for establishing connection with the central processing facility 4 and, thus, via the publicly switched telephone network and related data networks, if required, shown as 12, completes a telephone channel between the subscriber station 8 and the central processing facility 4. The subscriber station then identifies itself by code whereafter the particular information is determined by the central processing facility and transmitted to the subscriber station over the telephone channel. After all information has been transmitted, the subscriber station acknowledges receipt of the information, unless the information is not properly received. If this is the case, the signal can be retransmitted.

From the above, it can be appreciated that each subscriber station 10 need only share a telephone line with other equipment and the automatic dial-up capability would only seize the line when it is available. Thus, there is no additional charge for services required by the subscriber station other than the service for having the delivery system capability. The subscriber station merely uses the publicly switched telephone network and related data networks in its normal manner and requires no specialized equipment. Similarly, the central processing facility merely requires dial-up circuits for receiving incoming telephone calls from subscriber stations and must interact with the selective dissemination of information resulting from the processing of information inputted to the selective dissemination of information unit.

This system is extremely useful for business people who recognize they require timely information, but do not wish to pay for a dedicated service. The present system allows the advantages of the dedicated service at much reduced costs.

It is apparent from the above that the system of the present invention can advantageously be used with either of the systems described in the U.S. patent and the copending U.S. application and need not operate as a standalone system. Thus, the users would be able to have many services at their disposable.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An automated method for delivering selective information to individual receivers, comprising:
   receiving information not specifically addressed to any individual receivers,
   processing the received information according to individual predetermined requirements of the receivers to provide a reduced amount of information customized for each of the receivers according to the individual predetermined requirements of the receivers,
   producing a non-telephone link signal authorizing each of the receivers for which a reduced amount of information is to be delivered,
   each receiver upon receiving its non-telephone authorizing signal automatically seizing, when available, a non-dedicated telephone channel which is available from time to time and dialing a predetermined telephone number to complete a telephone channel, through which channel the reduced amount of information is delivered; each receiver, when authorized and connected with the telephone channel, produce an identifying signal transmitted through the telephone channel identifying the receiver, and thereafter
   determining by means of the identifyng signals the reduced amount of information for each authorized receiver to be transmitted through the telephone channel to the respective receiver, and
   transmitting the reduced amount of information to the respective receiver.

2. A method as claimed in claim 1, wherein the non-telephone link authorizing signal is produced as a free air broadcast signal.

3. A method for delivering selective information as claimed in claim 1, wherein;
   receiving of information includes stock market information and the processing of information includes specific requirements of the receivers to produce stock alerts in accordance with the specific requirements.

4. In a system for selective dissemination of customized information to subscriber stations identified by code,
   an automated information delivering system, comprising:
   a central station and a plurality of subscriber stations;
   said central station comprising:
   means for storing individual predetermined information requirements of each subscriber station,
   means for receiving information not specifically addressed to any subscriber stations,
   means for processing the received information to reduce the amount of information to be delivered to each subscriber station in accordance with individual predetermined information requirements of each subscriber station,
   means for producing a non-telephone authorizing signal identifying individual subscriber stations by code when information is to be delivered to them,
   means for receiving incoming telephone communications, and
   means for transmitting information to subscriber stations over a telephone channel once the particular station is identified;
   each subscriber station having a particular authorizing code and including means for receiving the non-telephone authorizing signal and determining whether the particular subscriber station authorizing code is present, means for automatically seizing, when available, a telephone channel which is available from time to time for making a connection with said central station via said means for receiving incoming telephone communications, means for identifying the subscriber station to the central station when connected therewith by means of said telephone channel, and means for receiving transmitted information from the central station.

5. In a system as claimed in claim 4, wherein said means for producing a non-telephone authorizing signal produces a free air broadcast signal.

6. In a system as claimed in claim 5 for providing personalized stock alerts.

7. In a system as claimed in claim 5, wherein said free air broadcast signal is produced by an FM paging system.

8. In a system as claimed in claim 5, including:
   means associated with each subscriber station, upon completion of information transmitted thereto by said central station, for transmitting an acknowledgement signal to the central station when the information has been properly received or otherwise produce a signal resulting in the information being retransmitted.

9. A method for delivering selective information as claimed in claim 1, wherein;
   receiving of information includes stock market information, information for news wires and medical alert information and the processing of information includes specific requirements of the user to produce notification in accordance with the specific requirements.

* * * * *